M. Wappich. Sheet 1, 2 Sheets.
Armor Clad.
N° 37,836. Patented Mar. 3, 1863.
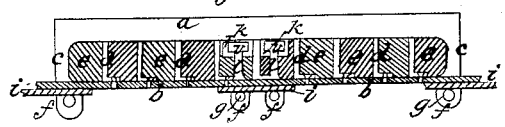
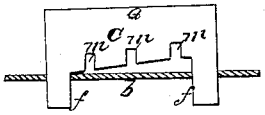
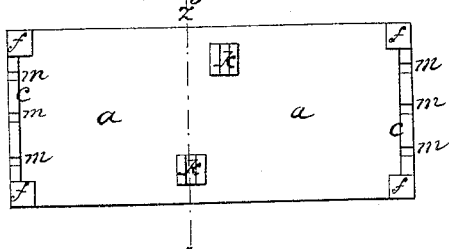
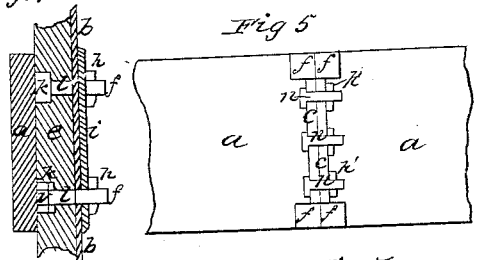
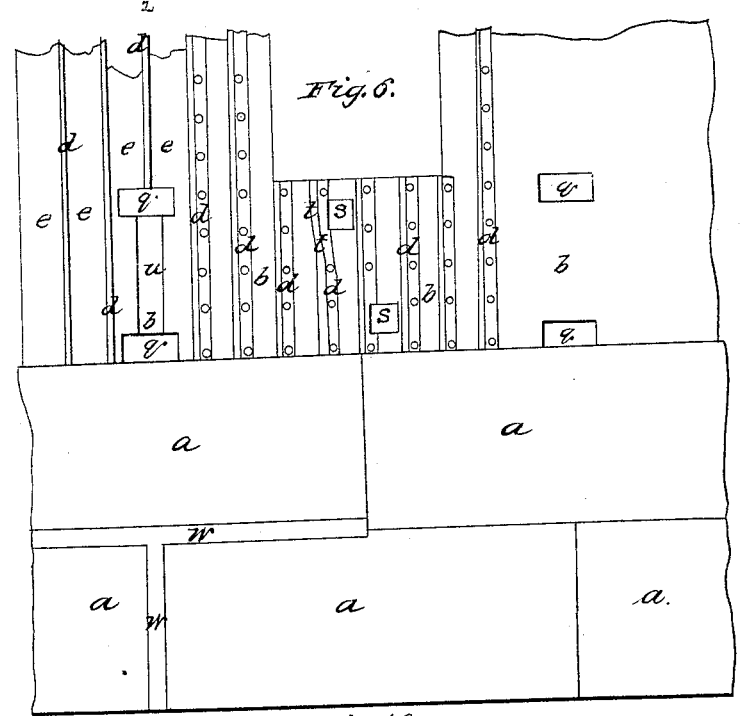
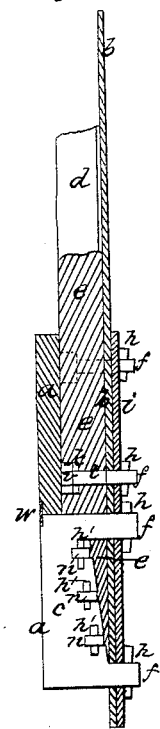
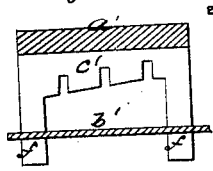
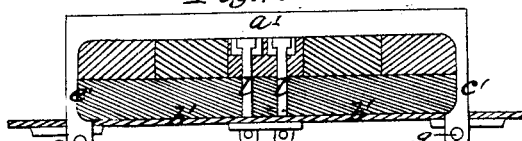
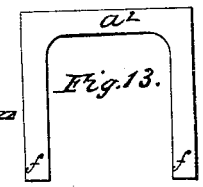
Witnesses.
Gustave Dietrich
Robt. W. Fenwick
Inventor.
Maximilian Wappich M. Wappich.
Armor Clad.
N° 37,836. Patented Mar. 3, 1863.
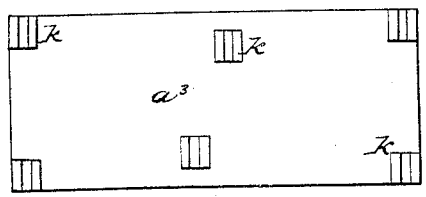
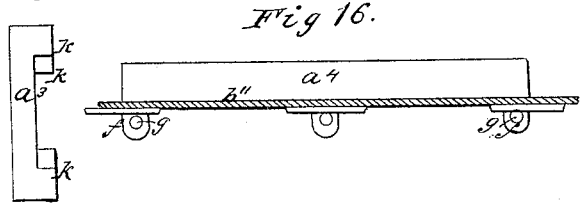
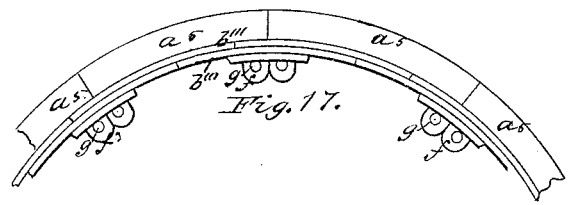
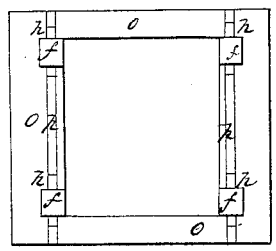
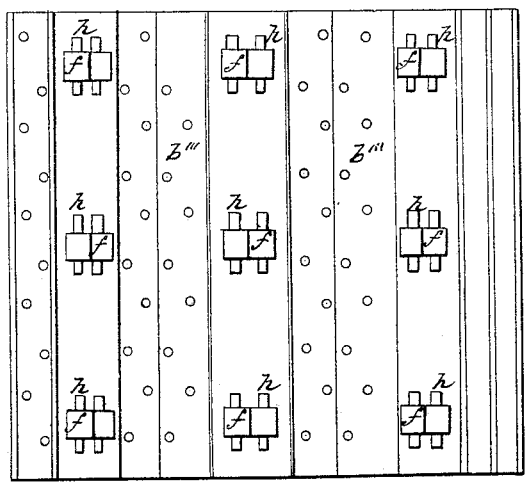
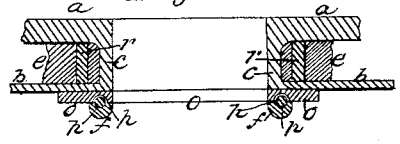
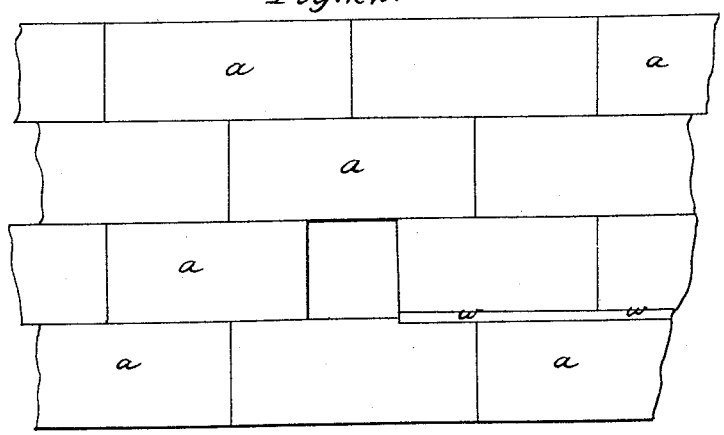
Witnesses.
Gustave Dieurch
Robt W. Fenwick
Inventor.
Maximilian Wappich.

UNITED STATES PATENT OFFICE.

MAXIMILIAN WAPPICH, OF SACRAMENTO, CALIFORNIA.

IMPROVED DEFENSIVE ARMOR-PLATE.

Specification forming part of Letters Patent No. 37,836, dated March 3, 1863.

*To all whom it may concern:*

Be it known that I, MAXIMILIAN WAPPICH, of Sacramento city, in the county of Sacramento, in the State of California, have invented certain new and useful improvements in armor-plates, backing, and fastenings for war-vessels, floating-batteries, fortifications, and other like structures; and I do hereby declare the following to be a full and exact description thereof, reference being had to the accompanyings drawings, and to the letters and characters marked thereon, like letters and characters in the several figures indicating the same or analogous parts, and in which drawings—

Figure 1 shows a horizontal view of the armor-plates, the mode of fastening their ends, and the improved bolts for drawing the armor-plates tight to the sides of the vessel, and also a section of the improved "backing." Fig. 2 is an end view of the same plate; Fig. 3, an inside view thereof; Fig. 4, a section through the plate on the line $z\ z$, Fig. 3, and showing the mode of securing its middle portion to the backing. Fig. 5 is an inside view showing the manner of securing the armor-plates together at their ends. Fig. 6 shows the armor-plate attached to the side of the vessel, also a portion of the backing ready to receive the plates, and a portion with the backing-ribs ready for filling in, together with a part of the iron hull of the vessel. Fig. 7 is a cross-section of Fig. 6. Fig. 8 illustrates the mode of securing the plate on the side of the vessel, and Fig. 9 a like mode as applied with the use of rivets. Fig. 10 shows the application of the armor-plates to the ordinary wood backing and iron hull. Fig. 11 is an end view of Fig. 10. Fig. 12 shows the plate attached to a wooden vessel, and Fig. 13 is an end view of Fig. 12. Fig. 14 shows a plate to be attached with the improved bolts, having no bent projections on the ends of the plates to pass through the hull of the vessel, but with the same locking device at the ends of said plates as is provided at their central portions. Fig. 15 is an end view of Fig. 14. Fig. 16 shows the mode of fastening the armor-plates direct to the iron hull of the vessel. Fig. 17 shows the plate applied to cupolas. Fig. 18 is an inside view of Fig. 17. Fig. 19 is a horizontal cross-section of the port-hole, and Fig. 20 an inside view of the same, and Fig. 21 a vertical cross-section thereof. Fig. 22 is an outside view showing the port-hole and armor-plates completely secured to the vessel, together with the water-tight joint.

My invention relates to the attachment and securing of armor-plates to war-vessels, floating-batteries, and fortifications; and it consists in providing the armor-plates with projections to pass through to the inside of the vessel, and there be secured to the interior of the hull of the vessel.

It consists, also, in providing the inside of said plates with slotted metal blocks for the purpose of holding the bolt-heads of the bolts which sustain and secure said plates to the sides of the vessel.

It consists also in the application of keys through the projections of the plates and through the ends of the bolts.

It consists also in providing and securing together the adjoining ends of the armor-plates, so that each plate shall enter into or compose a portion of the strength of the entire structure as a whole.

It further consists in applying ribs on the outside of the vessel at a less distance apart than the diameter of the projectile which the armor-plates are intended to resist, and in such position that they will impart the greatest possible strength to the vessel, while at the same time they will present the greatest resistance to the penetration of a projectile.

It consists also in the securing of the ends of the plates on the port-holes by an inside frame, so as to prevent the "buckling" of the plate if struck by projectiles.

It consists in an iron support underneath the armor-plate and around the port-hole to give the latter greater strength; and, lastly, it consists in making the armor-plates water-tight by cementing india-rubber over the joints of said plates.

In the drawings, $a$, Fig. 1, indicates the armor-plate, $c\ c$ the bent ends forming inward projections for the purpose of fastening the plate to the interior of the hull $b$ of the vessel. $d\ d$ are iron ribs securely riveted to the hull $b$, as shown, and set several inches apart and extending outward coincident with the thickness of the backing. *e e* are wooden beams or other suitable substances, which serve as fillings between the ribs *d d* and constitute the backing for the armor-plates. *f f* are blocks on the ends *c c* of the armor-plates, having holes *g g* drilled through them, as shown.

As represented in Fig. 4, a key, *h*, is to be driven into the holes *g* in the ends of the armor-plates to draw them tight to the backing of the vessel, and an iron plate, as at *i*, is interposed to give the hull greater strength under the key *h*.

As clearly shown in the figures, *k* is a slotted block or lug, welded onto the inside of the armor-plate *a*, for the purpose of holding the bolt-head of the bolt *l*, as represented, in order to draw the armor-plate tightly to the backing and hull.

The bent ends of the armor-plates are made with a thinner projection, C, in the middle, and notches *m m* cut therein, as shown in Figs. 2 and 3.

In Fig. 5, *n n* indicate the bolts to secure the ends of the armor-plates together.

It is thus evident that armor-plate may be most securely as well as readily fastened together, and that as the notches *m m* are open toward the inside of the vessel, if it should become necessary to remove any one of the plates it can be done by simply knocking out the keys *h h* inside the vessel and driving outward the plate to be removed, whereupon a new plate may readily be inserted and secured in its place.

The bent ends *c'* of the armor-plate *a'*, Figs. 10 and 11, are shown of greater length than in Figs. 1 and 2, as they are intended to pass through the ordinary eighteen-inch wood backing and a one-inch iron hull, *b'*.

In Figs. 12 and 13 the bent ends $c^2$ $c^2$ of the armor-plate $a^2$ are shown, as intended, to pass through a wooden vessel, but with the notched projections, as shown in Figs. 2 and 11, left off, though such projections may be used with advantage if desired.

I will here state that in Figs. 1 and 10 the notched projection of the bent ends *c* and *c'* of the armor-plate *a* and *a'* may be left out, but in doing this it will be at the sacrifice of the main advantage of having each plate enter in as a portion of the united strength of the entire structure.

In Figs. 14 and 15 I have shown the armor-plates as capable of being secured to the sides of the vessel simply by the use of the slotted blocks *k*.

In Fig. 16 I have illustrated a mode of securing the armor-plates directly to the hull *b''* of the vessel.

In Fig. 17 I also illustrate a mode of securing armor-plates to cupolas, turrets, pilot-houses, and like structures, said plates being directly in contact with and supported upon two thicknesses of smaller plates, *b'''* *b'''*, as shown in the figure, though any greater number of layers of small or thick plates may be used in lieu of those represented.

In Fig. 4 I have shown the bolt *l* drawn up or made taut by means of the key *h*. In Fig. 8 it is shown held in like condition by a screw-nut, and in Fig. 9 by a rivet-head.

As shown in the figures, the bent ends of the armor-plates are forged thinner than and at an angle with their body portion, so that they will fit together as in Fig. 5, and be held in such position by the bolts *n* in the notches *m*; and for holding such bolts in position, I prefer the application of the keys *h'*, as shown.

In order to give the port-hole the greatest strength and prevent the buckling of the armor-plate around it, the frame *o*, Figs. 19, 20, and 21, is put inside thereof and around its edges, as represented. This frame is composed of a metal plate of square form having notches cut in it for the passage of the block *f*, and with grooves, as at *p*, in order to give the keys *h* an effective hold when they are inserted in the blocks *f*.

Additional strength is imparted to the port-hole by the insertion of an iron frame between the armor-plate and the hull, as at *r* in Figs. 19 and 21.

To construct a vessel after my invention, the hull or side of the vessel is made ready with apertures, as at *q q*, Fig. 6, to receive the blocks *f* of the bent ends *c* of the armor-plate, and with smaller apertures, *s s*, for the bolts *l l*. (Shown in Fig. 1.) The backing-ribs *d d*, Fig. 6, are then riveted on the outside of the hull in vertical parallel positions a short distance apart, as indicated in Figs. 1 and 6, and where said backing-ribs, in being secured to the side of the vessel, would pass over the openings *q* or *s*, they may be bent or curved to avoid interfering with said openings, as clearly indicated in said last-named figure at *t t*; and where the bent ends *c c* of two armor-plates are fastened together, as represented in Fig. 5, it may be necessary to cut away the backing-ribs, as shown at *u*, Fig. 6. The wood backing *e e* will then be secured between the ribs *d d*, whereupon the armor-plates are put in place and their bent ends secured together, as represented in Fig. 5. In the small space between the bent ends of the armor-plates and the backing-ribs hard-wood blocks may be driven in, and wood or iron chucks may be driven behind the bolts *n n*, Fig. 5, and the side of the vessel *b*, Fig. 6. The bolts *l l*, Fig. 4, are then passed into the apertures *s s* from the inside of the hull with the heads *v*, Fig. 1 and Fig. 4, of the bolts in such position as to be slipped down and engage with the slotted blocks *k*, in which position, as clearly shown in Fig. 1, the heads *v* of the bolts *l* may be secured by wedges or iron chucks. The plate *i* is then slipped over the inside end of the bolts *l l* close up to the hull or side of the vessel, and the keys *h h*, Fig. 4, driven in the holes $g\,g$, which completes the attachment of the armor-plates to the vessel. The armor-plates are then heated on their joints with a coal-pan, and strips of india-rubber, as at $w$, Fig. 6, pressed with a smoothing-iron into the joints, thus rendering them water-tight. But to more effectually render the joints water-tight, I would here state that the plates may be grooved out on their edges where they adjoin, thus forming valleys, as it were, into which the rubber is pressed, thus avoiding any liability to have the rubber torn from the joints by the rubbing of the vessel against a dock, or by riding on her anchor-chains, or by the contact of the vessel with any object.

In place of the rubber any other suitable material may be used to make the joints water-tight.

The backing-ribs $d\,d$ may be made L-shaped, T-shaped, or I-shaped, riveted with angle-iron on or to the outside of the hull, but always in such position that they will present their edge toward the armor-plate.

In place of the wooden filling $e\,e$ any other suitable material may be used. If, instead of the notches $m\,m$, as shown in Fig. 2, holes were drilled through the bent ends $c$ for the insertion of the bolts $n\,n$, as in Fig. 5, the use of the drilled holes in place of the notches $m\,m$ for such purpose would cause the loss of the great advantage of replacing an armor-plate with facility when required.

The bent ends $c$ of the armor-plates, which form the sides of the port-hole, as shown in Fig. 19, may, in addition to their fastening to the port-hole frame $o$, be bolted or riveted to the inner port-frame $r$. (Represented in Figs. 19 and 21.)

The plates $i$, as shown in Figs. 1 and 4, instead of being made in short pieces or sections, may be made into long plates or strips, as indicated in Fig. 18, thus giving increased strength to the entire structure.

The port-hole is shown elongated, but may be made square, round, oval, or any other proper shape, and the armor-plates may be attached horizontal, vertical, or at any desired angle, or in straight courses, or in curved courses.

I have shown the backing-ribs applied vertically to the vessel, though it is evident they may be applied horizontal or in a position oblique to the sides of the vessel.

When the armor-plates are applied to fortifications, they may have a stone backing in lieu of iron backing plates.

The advantages of my invention consist, first, in a more secure attachment of them to the vessel; second, in rendering them stronger at those points in the plates where the attachment is effected; third, each one of the armor-plates constitutes a portion of the united strength of the entire structure, and together form a connected whole to give strength and security to the vessel; fourth, the backing-ribs form outer ribs to the hull of the vessel, giving enormous strength, but mainly they afford the greatest resisting power to armor-plates against the impact of projectiles; fifth, the port-holes are strongly secured; sixth, the armor-plates cannot strain the vessel or grind in their joints, and are water-tight; seventh, the armor-plates may be made smaller than like plates which are secured to the vessel by through-bolts, and are applicable to war-vessels, floating-batteries, fortifications, and all other similar structures.

Having thus described my invention, what I claim as new, and desire to secure by Letters Patent of the United States, is—

1. Armor-plates having projections $f$ to pass through the side of the vessel, substantially as and for the purpose described.

2. The projection $k$, which is formed on the inside of the flanged armor-plate to clasp the head of the bolt $l$, in combination with the bolt $l$ when fastened with key $h$ in the manner and for the purpose substantially as described.

3. The combination of the bent ends and angular projections and notches $m\,m$ with the flanged armor-plates, substantially as and for the purpose described.

4. Applying to the side of the vessel and behind the armor-plates backing-ribs $d\,d$ in an edgewise position, substantially as and for the purpose described.

5. Securing the port-hole by a united ring, $r$, inside frame, $o$, and flanged armor-plates, combined substantially as and for the purpose described.

6. Providing the adjoining edges of the flanged armor-plate with grooves or recesses $w$ in the manner and for the purpose set forth.

MAXIMILIAN WAPPICH.

Witnesses:
 GUSTAVE DIETERICH,
 JOSEPH SHURT.